United States Patent
Acharya

(12) 
(10) Patent No.: US 6,574,374 B1
(45) Date of Patent: Jun. 3, 2003

(54) ENHANCING IMAGE COMPRESSION PERFORMANCE BY MORPHOLOGICAL PROCESSING

(75) Inventor: Tinku Acharya, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/291,810

(22) Filed: Apr. 14, 1999

(51) Int. Cl.[7] .............................. G06T 5/20; G06T 5/30; G06T 7/40; G06K 9/40; G06K 9/46
(52) U.S. Cl. ....................... 382/257; 382/268; 382/308; 382/205
(58) Field of Search ................................ 382/257, 308, 382/260, 261, 275, 205, 195, 173, 268; 375/240.29

(56) References Cited

U.S. PATENT DOCUMENTS 5,768,440 A * 6/1998 Campanelli et al. ........ 382/261
5,819,035 A * 10/1998 Devaney et al. ............ 382/268
6,297,889 B1 * 10/2001 Loce et al. ................. 382/257
6,301,386 B1 * 10/2001 Zhu et al. ................... 382/176

OTHER PUBLICATIONS

S. H. Oguz et al., "Image Coding Ringing Artifact Reduction Using Morphological Post–Filtering", IEEE Second Workshop on Multimedia Signal Processing, Cat. No. 98EX175, Dec. 1998, pp. 628–633.*

R. A. Peters, II, "A New Algorithm for Image Noise Reduction Using Mathmatical Morphology", IEEE Transactions On Image Processing, vol. 4, No. 5, May 1995, pp. 554–568.*

* cited by examiner

Primary Examiner—Scott Rogers
(74) Attorney, Agent, or Firm—Blakely, Sokoloff, Taylor & Zafman LLP

(57) ABSTRACT

A method including defining a morphological filtering operator designed to remove ringing artifacts in a decompressed image, and then applying that operator upon pixels of the decompressed image that belong to non-texture image regions.

15 Claims, 5 Drawing Sheets

| 33 $x_1$ | 43 $x_2$ | 20 $x_3$ | 4 $x_4$ | 3 $x_5$ |
|---|---|---|---|---|
| 91 $x_{16}$ | 33 $x_{NW}$ | 42 $x_N$ | 5 $x_{NE}$ | 1 $x_6$ |
| 3 $x_{15}$ | 29 $x_W$ | 39 $x$ | 85 $x_E$ | 60 $x_7$ |
| 12 $x_{14}$ | 8 $x_{SW}$ | 70 $x_S$ | 40 $x_{SE}$ | 55 $x_8$ |
| 10 $x_{13}$ | 7 $x_{12}$ | 80 $x_{11}$ | 42 $x_{10}$ | 35 $x_9$ |

Fig. 4

ENHANCING IMAGE COMPRESSION PERFORMANCE BY MORPHOLOGICAL PROCESSING

BACKGROUND OF THE INVENTION

1. Field of the Invention

The invention is related to image processing. More specifically, the invention relates to the enhancement of the image quality by reducing artifacts due to heavy quantization for compression.

2. Description of Related Art

One crucial aspect of imaging is the process of image compression. In digital systems such as digital cameras image compression is utilized to store and transmit a large amount of image information in fewest number of bits possible while still maintaining an image quality that is acceptable. One example of a popular image compression scheme is JPEG (Joint Photographic Experts Group) which is based upon the Discrete Cosine Transform (DCT). Recently, new image compression schemes have been developed utilizing the Discrete Wavelet Transform (DWT). Unlike the DCT which is periodic in nature, the DWT is better suited and often more efficient in representing sharp discontinuities in data such as that present in image edge features. The DWT decomposes an input image into a number of "sub-bands" in multiple levels which are shown in FIG. 1. FIG. 1 shows the results of iteratively applying a 2-dimensional (2-D) DWT to an image.

The first iteration of the 2-D DWT decomposes an image I into four sub-bands S0, S1, S2 and S3. The sub-band S0 is also referred to as the "LL" sub-band, based on the double low-pass filtering-used to generate it. S0 (LL) is essentially a scaled approximation of the original image I, and contains the most salient spatial information to the original image. The sub-bands S1, S2 and S3 contain edge information and when the input image is noisy, also a considerable amount of that noise. The sub-bands S1, S2, and S3 are also referred to as HL, LH and HH sub-bands, respectively, due to the various low-pass and high-pass filtering used to generate them. The level 1 sub-bands S0, S1, S2, and S3 result from applying the 2-D DWT once to the image I. Since LL sub-band is the scaled version of the original image, we can apply the same decomposition in it. If the 2-D DWT is applied again, to the sub-band S0, a level 2 2-D DWT is being performed. This would result in the generation of four new sub-bands S10, S11, S12, and S13 after decomposition to S0. After such decomposition, a mechanism known as quantization, which is the mapping of one range of values to a smaller range, is employed to yield compression. One such quantization technique, known as uniform scalar quantization, divides the original data points by a threshold number T (or quantized parameter) greater than or equal to 1, in order to achieve the mapping.

Since the sub-bands S2, S3 and S1 are perceptually (from a visual standpoint) less significant than the S0 sub-band, these sub-bands may be more "roughly" quantized (i.e., assigned a higher quantization threshold T) so that the values therein are compressed greater. Such scalar quantization may use one quantization threshold $T_i$ throughout one sub-band $S_i$ and then different a $T_j$ in another sub-band $S_j$. Accordingly, FIG. 1 shows a threshold $T_0$ applicable to sub-band $S_3$, a threshold $T_1$ applicable to both sub-bands $S_1$ and $S_2$, $T_3$ applicable to $S_{13}$, $T_2$ applicable $S_{11}$ and $S_{12}$ and $T_4$ applicable to sub-band $S_{10}$. These quantization thresholds maybe selected depending upon the desired level of compression by introducing quantization loss. The higher the quantization threshold, the more compression and hence more possible loss when the compressed image is reconstructed.

Up to a certain level of quantization, the loss incurred may not be visible by the human eyes. Such compression is referred to as visually lossless compression. For the application which warrants more compression beyond a visually lossless scheme, further compression can be achieved by using a higher quantization threshold than that used for visually lossless compression. As a result, however, visible artifacts will occur in the reconstructed image. We can enhance the compression performance, by reducing these visible artifacts.

When DWT coefficients (from applying a DWT upon an image) are then heavily quantized, "Ringing Artifacts" are often produced in the decompressed (reconstructed) image. Due to the well-known Gibbs phenomenon, the Ringing Effect (which leads to Ringing Artifacts) places rings around a homogenous area of an image such as a clear sky or background. To reduce this effect, several digital filtering techniques have been devised, but these, when applied, have the additional effect of introducing smoothness or blurring. By reducing the sharpness of an image, such filtering, used to remove the Ringing Effect, also degrades image quality. It would be desirable to remove ringing artifacts while preserving the sharp edges which are the most perceived features by the human visual system.

SUMMARY

What is disclosed is a method that includes defining a morphological filtering operator designed to remove ringing artifacts in a decompressed image, and then applying that operator upon pixels of the decompressed image that belong to non-texture image regions.

BRIEF DESCRIPTION OF THE DRAWINGS

FIG. 4 is an example of performing texture detection according to at least one embodiment of the invention.

DETAILED DESCRIPTION OF THE INVENTION

Figure 1:
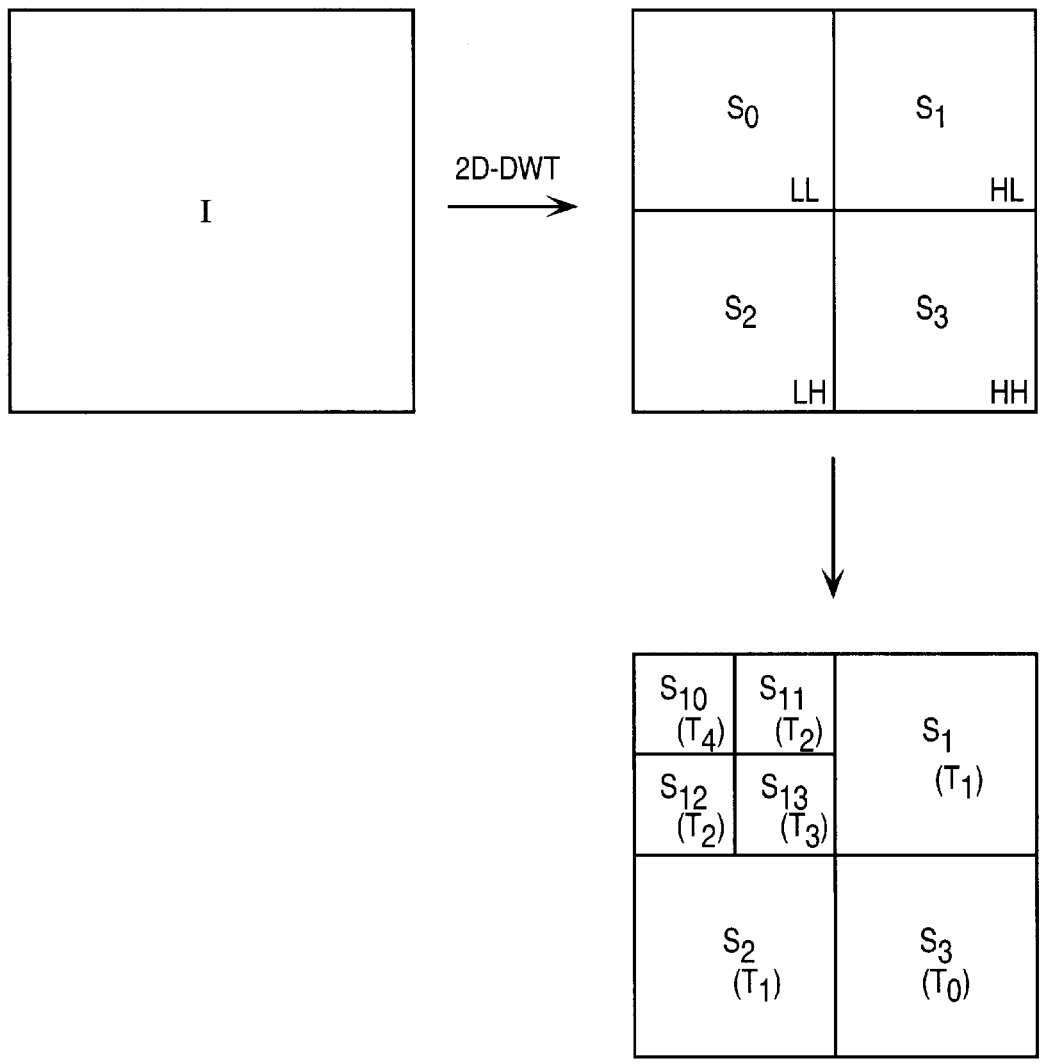
FIG. 1 illustrates the decomposition of an image using a Discrete Wavelet Transform.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

One way to enhancing the image compression performance (higher compression) is to use coarser quantization (which introduces artifacts in the decompressed image) and reduce the resulting artifact by a suitable post-processing technique. In order to achieve reduction of the Ringing, a post image processing technique is described that identifies textures and applies a morphological filtering technique on the non-texture pixels. The appearance of ringing artifacts are more prominent in homogenous areas of an image compared to its appearance in texture regions. Morphological filters, when properly employed, can have the effect of preserving sharp edge features which are most readily perceived by the human visual system. Morphology, which is characterization of the form and structure of an object, can be based upon two operations known as dilation and erosion. Dilation of an object or sub-image causes that object or sub-image to grow in relation to a defined background neighborhood (also called a structuring element). Erosion, on the other hand, causes the object or sub-image to be reduced or shrink in relation to a background neighborhood. Dilation can make that object or sub-image more prominent by fitting into the region or background, while erosion can obscure it with the background. The neighborhood chosen may be either geometric (following a set pattern) or adaptive (modified depending upon certain characteristics).

The operations of dilation and erosion is not static and may be defined as befits the application. If we let the neighborhood about and including a pixel x be designated as $G(x)$, then dilation and erosion are defined, in one embodiment of the invention as:

$$\text{dilation}(x) = \text{maximum}\{G(x)\}$$

$$\text{erosion}(x) = \text{minimum}\{G(x)\}.$$

Thus, a dilation of a pixel would yield a set of all the maximums of a G neighboring surrounding each of the pixels in the given neighborhood $G(x)$ while an erosion would yield a set of the minimums of a G neighborhood surrounding each of the pixels in the $G(x)$ neighborhood. By convention and definition, dilation and erosion are not inverse operations of each other. Two other morphological operations based on erosion and dilation may be defined as:

$$\text{closing}(x) = \text{erosion}(\text{dilation}(x));$$

and $$\text{opening}(x) = \text{dilation}(\text{erosion}(x)).$$

Thus, according to the non-inversibility of the dilation and erosion operations with respect to one another, generally:

closing(x)<>opening(x), except in certain degenerate cases.

Utilizing these morphological operations, a filtering operation can be defined and selectively applied to an image as described below. Practically, the "opening" operations has a "low-pass" filtering in an image which reduces the noise or irregularities in the structuring element. "Closing" is considered to be a dual operation to "opening" in that such features in the structuring element are highlighted.

Figure 2:
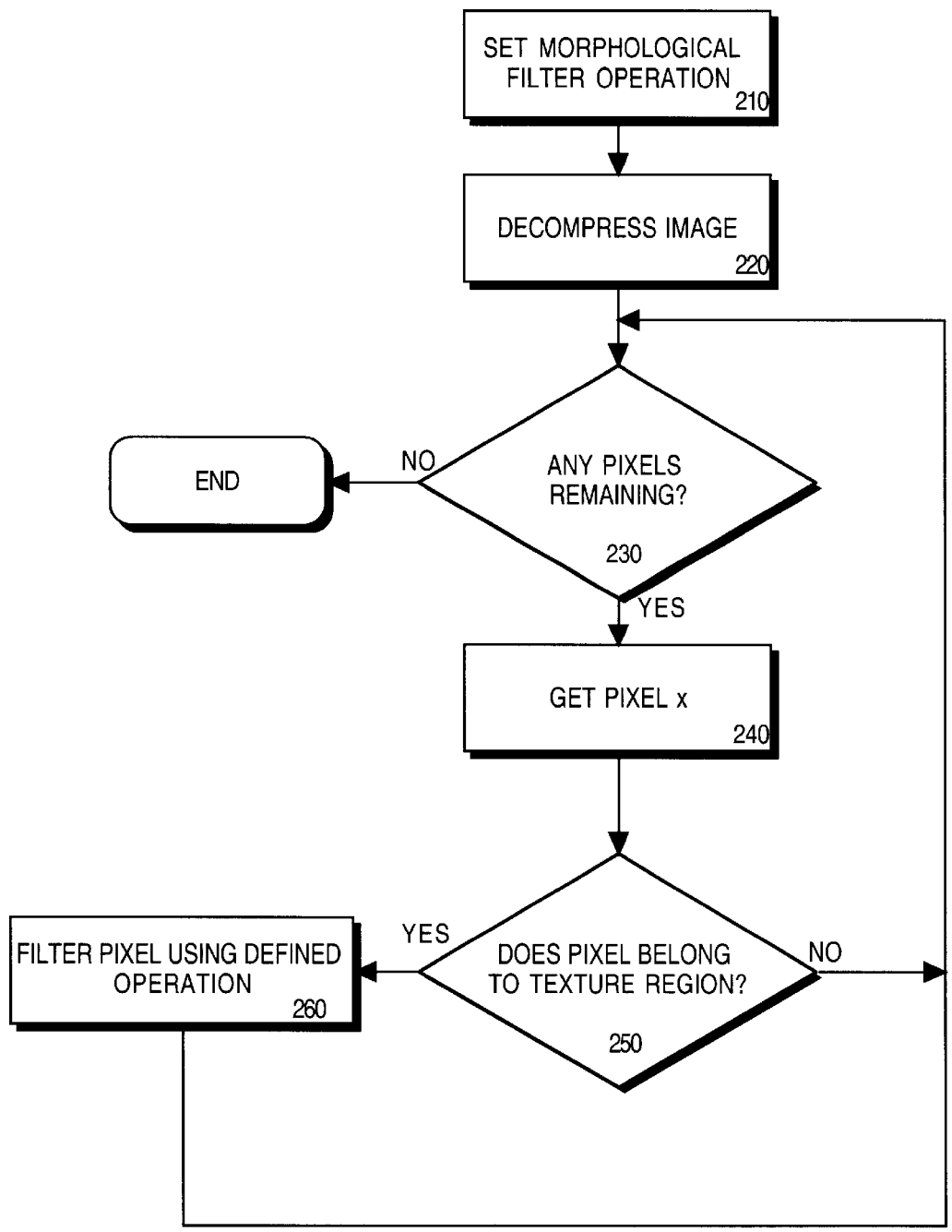
FIG. 2 is a flow diagram of the basic methodology of the invention.

FIG. 2 is a flow diagram of the basic methodology of the invention.

The methodology for removing ringing artifacts includes a morphological filtering performed on a post-capture and compression basis. First, a filter operation should be selected that will be applied to the image space (block 210). This filtering operation is based upon morphological operations such as those given above. In one embodiment of the invention, a filtering operation $f(x)$ is selected to be:

$$f(x) = \{\text{opening}(x) + \text{closing}(x)\}/2.$$

This filter is to be applied selectively to the image in its non-texture or homogenous regions. In this processing technique, the image should be operated upon when in decompressed form. For instance, consider an image captured by a digital camera or other such device. As described in greater detail above, this image is often compressed by techniques utilizing such constructs as DWT (Discrete Wavelet Transform) and are simultaneously or subsequently quantized throughout the various image sub-bands. Such a compressed image may show ringing artifacts upon decompression if coarser quantization is applied. Since each DWT sub-band may have less severe or more sever quantization (i.e., a higher or lower quantization threshold) than others, the methodology can take this differentiation into account. Once the image is decompressed (block 220), the morphological filtering operation defined at block 210 may then be employed. Once set the filtering operation can be repeatedly used such that it need not be changed for each image.

The methodology operates repeatedly upon each pixel in the image (or sub-image) and thus checks whether any pixels remain to be processed (block 230). If so, the pixel is fetched (i.e., its intensity value is read out, along with its coordinates in the image map) (block 240). According to an embodiment of the invention, the morphological filtering operation is applied only to non-texture image regions. Thus, it must be determined whether or not the fetched pixel belongs to a texture region or a more homogenous non-texture region (block 250). A procedure for doing so in accordance with at least one embodiment of the invention is described in greater detail below. If the pixel does not belong to a texture region of the image, then the pixel is filtered using the defined filtering operation (block 260), which is morphological, rather than linear, in nature. If the pixel does belong to a texture region, no filtering is applied to it. This has the intended advantage of not obscuring or smoothing edge features in the image since the filter is applied to pixels belonging to homogenous rather than texture regions. Further, since the technique is a post-processing methodology, an image may be more highly compressed, at least in as much as such compression was conventionally limited when having to consider the ringing effect.

The methodology shown in blocks 230 through 260 are repeated for each pixel in the image until all such pixels are subjected to the selectively applied morphological filtering.

Figure 3:
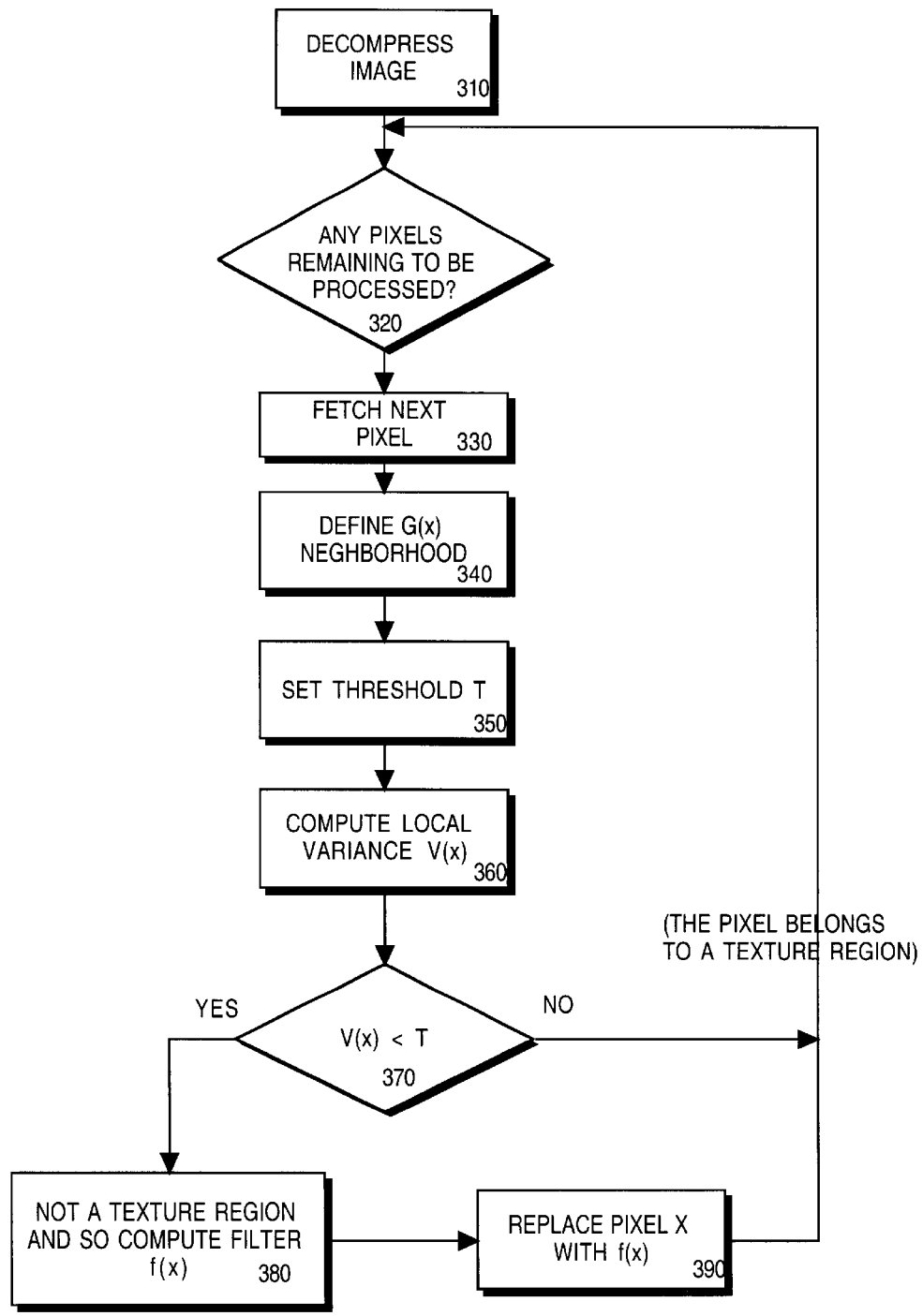
FIG. 3 is a flow diagram of one embodiment of the invention.

FIG. 3 is a flow diagram of one embodiment of the invention.

As mentioned above, the embodied methodology is designed to work on a pot-processing basis. Thus, the image is first decompressed (block 310). The methodology operates repeatedly upon each pixel in the image (or sub-image) and thus checks whether any pixels remain to be processed (block 320). If so, the pixel x is fetched (i.e., its intensity value is read out, along with its coordinates in the image map) (block 330).

A pre-requisite for a morphological filtering operation is the definition of a neighborhood (called a structuring element) over which it is evaluated. When applied to image processing, the structuring element is a neighborhood about the pixel (or sub-image) under consideration. Thus, about the fetched pixel x, a neighborhood $G(x)$ should be defined (block 340). The neighborhood may be geometric, fitting a set pattern about and including the pixel x, such as a three pixels by three pixels square area. Also, the neighborhood may be adaptive, and depending upon the location (or sub-band association) of the pixel, a differing neighborhood. Where color planes have been separated, such as in an RGB image originating pre-compression in a Bayer pattern form, the ringing effect reduction is applied separately to each color plane. In such instance so too the chosen neighborhood includes pixels belonging only to color plane associated with the pixel x.

Once a neighborhood is chosen, a threshold is also set (block 350). This threshold is used in comparing with a variance of the neighborhood such that the determination may be made whether the pixel x belongs to a texture or not. The threshold T may be uniform throughout the entire image or vary according tot the sub-band association, color plane association or other factors of the pixel x. If the threshold T is uniform throughout, it need not be chosen for each pixel, unlike what is exemplified in the flow of FIG. 3.

According to one embodiment of the invention, the primary metric utilized in discriminating texture from non-texture regions is the local variance V(x) over the neighborhood G(x). In general, the variance for N sample points $Y_1, Y_2, \ldots Y_N$ is given by:

$$V(x) = \sqrt{\sum_{i=1}^{N} (\bar{Y} - Y_i)^2 / N}$$

As given above, the local variance V(x) with sample points consisting of the pixel intensities within the neighborhood G(x) is then computed (block 360). The disturbance due to ringing artifacts is more pronounced and prominent in homogenous regions of the image than in texture regions. Whether a particular pixel belongs to a texture or not can be ascertained by comparing the variance V(x) with the chosen threshold T (block 370). If the computed variance V(x) is less than the chosen threshold T, then the morphological filtering operation is performed. In such an instance, first, the filter operator f(x) is computed (block 380). As described above, one embodiment of the invention uses a filter operator f(x)={opening(x)+closing(x)}/2. The filtering is performed by replacing the fetched pixel x with the value resulting from the computed filter operator f(x) (block 390).

By discriminating pixels belonging to textures and non-textures, the morphological filtering can be selectively performed on those pixels belonging to non-textures. Thus, if the variance V(x) is not less than the threshold T, no filtering operation is performed. Alternatively, it may be desirable to perform one type of filtering operation on non-texture pixels and yet another operation (whether filtering or some other image enhancement) on texture pixels. The processing shown in blocks 320 through 390 are repeated for all pixels in the image (or sub-image) being processed.

FIG. 4 is an example of at least one embodiment of the invention.

FIG. 4 shows a exemplary sample neighborhood G(x) of pixels $x_K$ about a central pixel x, where K denotes the direction of the sample pixel adjacent to x or numerically designates a position about the pixel x. Each numerical value represents the intensity value of the pixel such as that derived from exposing those pixels in a sensor to capture an image of a scene. In the example, the pixel x has intensity value of 39 while its north neighbor $x_N$ has a value of 42 and so on as shown.

One way of expressing the closing function in terms of set membership is:

closing(x)=erosion{G(y)} where $y_i$=dilation($x_i$), $x_i \epsilon G(x)$.

Referring to the pixel values given in FIG. 4, dilation ($X_{NW}$)=maximum {G($X_{NW}$)}=maximum {33, 43, 20, 91, 33, 42, 3, 29, 39}=91 which is the pixel $X_{16}$. Likewise, dilation ($X_N$)=maximum {G($X_N$)}=maximum {43, 20, 4, 33, 42, 5, 29, 39, 85}=85 which is pixel value $X_E$. Thus, by applying this procedure, the dilation (x) results in the pixel set $X_{16}$, $X_E$, $X_E$, $X_E$, $X_E$, $X_E$, $X_{11}$, and $X_{16}$.

The erosion (x) function is likewise computed by taking minimums around a neighborhood about each of pixels surrounding the pixel x. The closing (x) associates the two set operations as the erosion (dilation (x)). Thus, closing (x) would take an erosion of the set of pixels resulting from the dilation of the pixel x. Again, expressing the opening operation in set membership:

opening(x)=dilation{G(y)} where $y_i$=erosion($x_i$), $x_i \epsilon G(x)$.

In each dilation and erosion operation, the pixel x is included as part of the neighborhood G(x). In the example shown in FIG. 4, dilation(x) equals 85 (the value of $X_E$) while erosion(x) equals 5 (the value of $X_{NE}$). Likewise, the opening(x) and closing(x) are defined as closing(x)=erosion (dilation(x)) and opening(x)=dilation(erosion(x)).

If the above specified morphological filter f(x) is to applied upon x, then first x must be judged as belonging to a region of non-texture. Thus, according to the embodiment described in FIG. 3, the local variance V(x) for the sample neighborhood G(x) must be computed. To do so, the mean x' of the sample set G(x) must be determined. The mean is: {x+$x_N$+$x_{NE}$+$x_E$+$x_{SE}$+$x_S$+$x_{SW}$+$x_W$+$x_{NW}$}/N, where N is the number of sample points. In this example, the mean x' is 351/9 or 39. The variance V(x) then is 24.36, in accordance with the formula given above. The variance is then compared to a threshold value T. Experimental results have shown that for a 8-bit intensity value per pixel (i.e., 0 to 255), a threshold T between 60 and 70 yield good texture discrimination.

Figure 5:
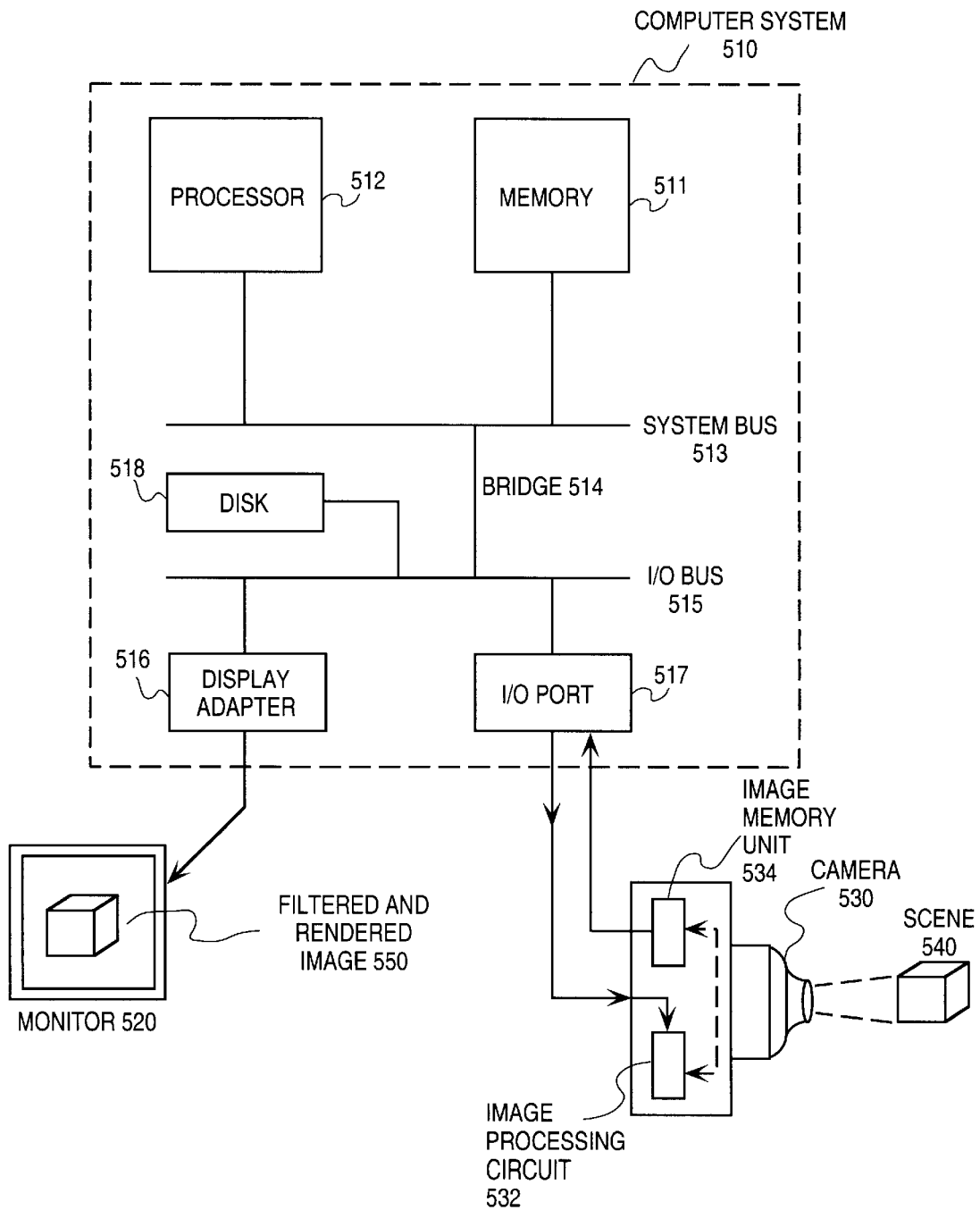
FIG. 5 is a system diagram of one embodiment of the invention.

FIG. 5 is a system diagram of one embodiment of the invention.

Illustrated is a computer system 510, which may be any general or special purpose computing or data processing machine such as a PC (personal computer), coupled to a camera 530. Camera 530 may be a digital camera, digital video camera, or any image capture device or imaging system, or combination thereof that has a image sensor comprised of a plurality of sensor locations known as pixels and may be utilized to capture an image of a scene 540. Captured images are compressed by quantization and predictive encoding by an image processing circuit 532 so that they can be efficiently stored in an image memory unit 534, which may be a ROM, RAM or other storage device such as a fixed disk. The image contained within image memory unit 534 that is destined for computer system 510 is the result of compression within the camera 530 and thus may show ringing artifacts when decompressed. The ringing artifact reduction scheme of the invention in various embodiments is intended to provide an efficient way of reducing the ringing artifact while not disturbing the amount of compression achieved in camera 530. This allows camera 530 to compress images to a greater degree so that faster throughput or less memory utilization is realizable.

The stored compressed images in memory unit 534 are transferred to computer system 510 for local storage thereon and may be decompressed using a processor 512 such as the Pentium® (a product of Intel Corporation) and a memory 511, such as RAM, which is used to store/load instruction addresses and result data. Once decompressed, the resulting pixel map of the image can be subjected to morphological filtering in order that ringing artifacts be reduced. Morphological filtering, as described in more detail above in various embodiments, consists of statistical analysis of a neighborhood of pixel locations (such as computing mean and variance), comparisons and then computation of filter operator including the finding of maxima and minima. The instructions for carrying out and executing such filtering may be stored to a disk 518 or memory 511. It would be readily apparent to one in the art to program a computing machine to perform ringing artifact reduction given that the methodology described in the various embodiments of the invention are adhered to.

Computer system 510 has a system bus 513 which facilitates information transfer to/from the processor 512 and memory 511 and a bridge 514 which couples to an I/O bus 515. I/O bus 515 connects various I/O devices such as a display adapter 516, disk 518 and an I/O port 517, such as a serial port. Many such combinations of I/O devices, buses and bridges can be utilized with the invention and the combination shown is merely illustrative of one such possible combination.

Image processing circuit 532 consists of ICs and other components which may execute, among other functions, the DWT compression of captured images. After such compression, and transfer to computer system 510, the compressed images are decompressed on computer system 510 using suitable application software (or hardware in combination thereof) executable with the aid of processor 512. After being decompressed, the morphological filtering procedure is executed and may result in the replacement of certain non-texture pixels by a filter operator result, as discussed above. The enhanced, ringing artifact-reduced image data may then be rendered visually using a display adapter 516 into a rendered image 550. In a videoconferencing application, the image data in its compressed form may be communicated over a network or communication system to another node or computer system in addition to or exclusive of computer system 510 so that a videoconferencing session may take place. Whatever the intended application or use, the end result will be a higher quality rendered image 550 that displayed onto monitor 520 or other nodes in a videoconferencing session as compared with conventional imaging. Advantageously, the level of compression need not consider as strongly the effect of a ringing artifact upon decompression, since such artifacts are filtered by the morphological operation described herein. Thus, higher compression ratios as desired by the application/end use and higher quality images after decompression and rendering are simultaneously achievable.

In the foregoing specification, the invention has been described with reference to specific exemplary embodiments thereof. It will however be evident that various modifications and changes may be made thereto without departing from the broader spirit and scope of the invention as set forth in the appended claims. The specification and drawings are accordingly to be regarded as illustrative rather than restrictive.

What is claimed is:

1. A method comprising:
   defining a morphological filtering operator designed to remove ringing artifacts in a decompressed image; and
   applying said operator upon pixels of said decompressed image that belong to non-texture image regions by fetching each pixel of the image, determining a variance of each pixel and comparing the variance to a predetermined threshold, wherein the predetermined threshold is determined based on factors of each pixel.

2. A method according to claim 1 wherein said defining a morphological filtering operator includes:
   defining a dilation operation about a neighborhood, said neighborhood including a first pixel; and
   defining an erosion operation about said neighborhood.

3. A method according to claim 2 wherein said dilation operation includes finding a maximum intensity value among all sample pixels in said neighborhood, each sample pixel having an intensity value.

4. A method according to claim 2 wherein said erosion operation includes finding a minimum intensity value among all sample pixels in said neighborhood, each sample pixel having an intensity value.

5. A method according to claim 2 wherein said defining a morphological filtering operator includes:
   defining an opening operation; and
   defining a closing operation.

6. A method according to claim 5 wherein said opening operation includes taking the dilation of the erosion of said first pixel in said neighborhood.

7. A method according to claim 5 wherein said closing operation includes taking the erosion of the dilation of said first pixel in said neighborhood.

8. A method according to claim 5 wherein said morphological filtering operator is the average of the results obtained by performing said opening operation and said closing operation.

9. A method according to claim 1 wherein said applying includes:
   fetching a pixel from said decompressed image; and
   determining whether said fetched pixel belongs to a non-texture region or not.

10. A method according to claim 9 wherein said determining includes:
    setting a threshold;
    computing a local variance in a neighborhood of sample pixels, said neighborhood including said fetched pixel; and
    comparing said variance with said threshold, if said variance is less than said threshold, then said pixel is determined to belong to a non-texture region, and if not, said pixel is determined to belong to a texture region.

11. A method according to claim 1 wherein said decompressed image was previously compressed using a Discrete Wavelet Transform technique.

12. A method according to claim 11 wherein said technique was performed by a digital camera.

13. A system according to claim 1 wherein said decompressed image was previously compressed using a digital camera.

14. An article comprising a computer readable medium having instructions stored thereon which when executed cause:
    defining a morphological filtering operator designed to remove ringing artifacts in a decompressed image; and
    applying said operator upon pixels of said decompressed image that belong to non-texture image regions by fetching each pixel of the image, determining a variance of each pixel and comparing the variance to a predetermined threshold, wherein the predetermined threshold is determined based on factors of each pixel.

15. A system comprising:
    a memory;
    a processor coupled to said memory, said processor adapted to cause:
       defining a morphological filtering operator designed to remove ringing artifacts in a decompressed image; and
       applying said operator upon pixels of said decompressed image that belong to non-texture image regions by fetching each pixel of the image, determining a variance of each pixel and comparing the variance to a predetermined threshold, wherein the predetermined threshold is determined based on factors of each pixel.

* * * * *